(Model.)
A. G. BENSON.
LOCKING FERRULE.
No. 481,462. Patented Aug. 23, 1892.
Fig. 1.
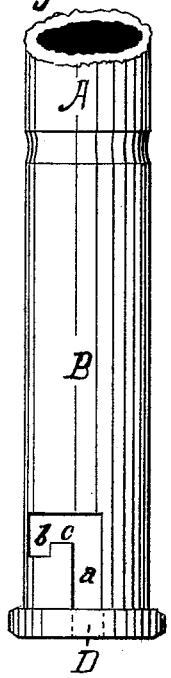
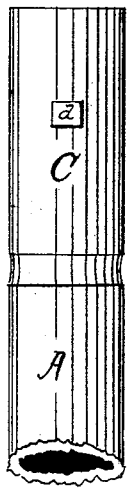
Fig. 2.
WITNESSES:
G. A. Atkinson
Grant Stickham
INVENTOR
Alfred G. Benson

UNITED STATES PATENT OFFICE.

ALFRED G. BENSON, OF CAMDEN, NEW JERSEY.

LOCKING-FERRULE.

SPECIFICATION forming part of Letters Patent No. 481,462, dated August 23, 1892.

Application filed June 1, 1891. Serial No. 394,621. (Model.)

*To all whom it may concern:*

Be it known that I, ALFRED G. BENSON, a citizen of the United States, residing at Camden, in the county of Camden and State of New Jersey, have invented a new and useful Lock-Ferrule for Fishing-Rods and for other Purposes, of which the following is a specification.

My invention relates to an improvement in ferrules for jointing rods together, either for fishing purposes or where a continuous rod of any required length may be useful.

The object of my improvement is to provide a self-locking ferrule for said purposes, making it inseparable by tension and torsion and when the sections are unjointed to take up the smallest space possible consistent with the purposes for which said rod may be used, making it convenient in transportation or in storing while not in use.

I attain these objects by the mechanism illustrated in the accompanying drawings, in which—

Figure 1 is a longitudinal surface view of the female part of a lock-ferrule embodying my invention, mounted at the end of a rod; and Fig. 2 is a longitudinal surface view of the male part of a lock-ferrule also embodying my invention, mounted at the end of a section of the same rod.

Similar letters refer to similar parts in the two views.

A is the rod, B is the female ferrule of said rod, and C the male ferrule. The former is provided with a locking-slot composed of the longitudinal and parallel parts $a$ $b$, connected by a horizontal part $c$. $d$ is a locking stud or boss projecting from the ferrule C of a size commensurate with the dimensions of the locking-slot D.

The operation of my invention is as follows: The ferrule C is inserted in the ferrule B, the locking-stud $d$ passing along the part $a$ until it reaches the horizontal part $c$, when either of the ferrules is turned until the said stud is in line with the part $b$, when the ferrules are pulled apart until the stud contacts with the bottom part $b$, whereby it is prevented from accidentally disconnecting and drawing apart and makes a locked ferrule.

I claim—

A locking ferrule consisting of a male ferrule having a locking stud or boss thereon, and a female ferrule having an L-shaped slot therein for engagement with said stud, the terminal recess of the slot serving to engage the stud and thereby lock the female ferrule against tensional or torsional movement, as set forth.

In testimony whereof I hereunto sign my name in presence of two subscribing witnesses.

ALFRED G. BENSON.

Witnesses:
C. D. VAN DUYN,
HENRY TROTH.